(12) United States Patent
Drozd et al.

(10) Patent No.: US 11,272,513 B2
(45) Date of Patent: Mar. 8, 2022

(54) ADJUDICATION OF ACCESS POLICIES IN WIRELESS DEVICE NETWORK

(71) Applicant: AndroMetaX Inc., Rome, NY (US)

(72) Inventors: Andrew Louis Drozd, Rome, NY (US); Joseph Robert McCoy, Frankfort, NY (US); Christopher Dean Maracchion, Rome, NY (US); Timothy Otis Woods, Cicero, NY (US); John James Hrabik, Jr., Cansota, NY (US); Sean Robert Furman, Rome, NY (US)

(73) Assignee: ANDRO COMPUTATIONAL SOLUTIONS, LLC, Rome, NY (US)

( * ) Notice: Subject to any disclaimer, the term of this patent is extended or adjusted under 35 U.S.C. 154(b) by 80 days.

(21) Appl. No.: 16/548,030

(22) Filed: Aug. 22, 2019

(65) Prior Publication Data

US 2020/0068573 A1 Feb. 27, 2020

Related U.S. Application Data

(60) Provisional application No. 62/720,956, filed on Aug. 22, 2018.

(51) Int. Cl.
| | |
|---|---|
| *H04W 72/04* | (2009.01) |
| *H04L 27/00* | (2006.01) |
| *H04W 8/00* | (2009.01) |
| *H04W 4/70* | (2018.01) |
| *H04W 48/16* | (2009.01) |
| *H04W 12/08* | (2021.01) |

(Continued)

(52) U.S. Cl.
CPC ..... *H04W 72/0493* (2013.01); *H04L 27/0006* (2013.01); *H04M 15/8235* (2013.01); *H04W 4/70* (2018.02); *H04W 8/005* (2013.01); *H04W 12/08* (2013.01); *H04W 12/37* (2021.01); *H04W 48/16* (2013.01); *H04W 48/18* (2013.01)

(58) Field of Classification Search
CPC . H04W 72/0493; H04W 16/14; H04W 48/16; H04W 48/18
See application file for complete search history.

(56) References Cited

U.S. PATENT DOCUMENTS

| | | | |
|---|---|---|---|
| 7,151,925 B2 * | 12/2006 | Ting | H04M 3/42178 455/418 |
| 9,019,855 B2 * | 4/2015 | Nielsen | H04B 10/25751 370/252 |

(Continued)

*Primary Examiner* — Raj Jain
(74) *Attorney, Agent, or Firm* — Hoffman Warnick LLC

(57) ABSTRACT

Methods and systems for controlling dynamic spectrum access (DSA) for the purposes of wirelessly communicating or exchanging data within a network environment are disclosed. Methods may include detecting, via at least one asset included in a wireless device network, at least one candidate asset attempting to enter the wireless device network from an external network, and constructing a spectrum profile for the wireless device network based on metadata for transactions between assets in the wireless device network. The method may also include applying an access policy including the spectrum profile to the at least one candidate asset within the wireless device network, and admitting the at least one candidate asset to the wireless device network in response to applying the access policy to the at least one candidate asset.

20 Claims, 7 Drawing Sheets

(51) Int. Cl.
*H04M 15/00* (2006.01)
*H04W 12/37* (2021.01)
*H04W 48/18* (2009.01)

(56) References Cited

U.S. PATENT DOCUMENTS

| | | | |
|---|---|---|---|
| 9,300,411 B1 | 3/2016 | Dehnie et al. | |
| 9,941,959 B2 * | 4/2018 | Heath | H04B 1/1027 |
| 10,055,554 B2 | 8/2018 | Papa et al. | |
| 10,080,141 B2 | 9/2018 | Buchmayer et al. | |
| 10,257,729 B2 | 4/2019 | Carbajal et al. | |
| 10,292,052 B2 | 5/2019 | Wang | |
| 10,368,246 B2 | 7/2019 | Khambekar et al. | |
| 10,581,847 B1 * | 3/2020 | Sun | H04W 12/40 |
| 10,719,498 B2 * | 7/2020 | Darcy | G06F 16/214 |
| 10,819,747 B1 * | 10/2020 | Sedky | H04L 63/104 |
| 10,826,685 B1 * | 11/2020 | Campagna | H04L 9/0637 |
| 10,833,843 B1 * | 11/2020 | Vijayvergia | H04L 9/30 |
| 2016/0269402 A1 * | 9/2016 | Carter | H04L 9/3013 |
| 2016/0342977 A1 * | 11/2016 | Lam | G06Q 20/0658 |
| 2017/0005804 A1 * | 1/2017 | Zinder | G06F 21/6254 |
| 2017/0078718 A1 * | 3/2017 | Ioffe | H04N 21/8355 |
| 2017/0221029 A1 * | 8/2017 | Lund | H04W 12/04 |
| 2017/0295180 A1 * | 10/2017 | Day | H04L 9/0836 |
| 2017/0346907 A1 | 11/2017 | Clawsie et al. | |
| 2018/0165588 A1 * | 6/2018 | Saxena | G06Q 20/02 |
| 2018/0165612 A1 * | 6/2018 | Saxena | G06N 20/00 |
| 2018/0165758 A1 * | 6/2018 | Saxena | G06Q 30/02 |
| 2018/0189732 A1 * | 7/2018 | Kozloski | G06F 8/71 |
| 2018/0294908 A1 * | 10/2018 | Abdelmonem | H04W 28/04 |
| 2019/0238338 A1 | 8/2019 | O'Brien et al. | |
| 2020/0068573 A1 * | 2/2020 | Drozd | H04M 15/00 |

* cited by examiner

ADJUDICATION OF ACCESS POLICIES IN WIRELESS DEVICE NETWORK

TECHNICAL FIELD

Embodiments of the disclosure relate to the control of dynamic spectrum access (DSA) for the purposes of wirelessly communicating or exchanging data within a network environment. This environment may contain a variety of wireless devices including fixed and mobile assets. Embodiments may further have transient mobile assets that are autonomous in nature and represent machine-to-machine data exchanges that may use real-time data for decision-based actions.

BACKGROUND

Current radio technologies provide for spectrum agility across many modalities of radio operations via software control of the signal. U.S. Pat. No. 7,151,925 (incorporated herein by reference), for example, provides a "system and method for providing one hardware platform to implement multiple wireless communication standards, services, and applications." This system may provide a software defined radio (SDR) for digital signal communication. Other examples such as U.S. Pat. No. 9,300,411 (incorporated herein by reference), discuss that such SDRs can incorporate an awareness of how to use the available spectrum through the sensing of the local electromagnetic operating environment (EMOE) in order to optimize its operating parameters for efficient spectrum use with DSA. These are reflective of conventional tools that indicate the maturity of the SDR (often referred to as cognitive radio) technology and the notion that such technologies can help to better use the available spectrum for wireless communication.

SUMMARY

A first aspect of the disclosure provides a method for managing access policies, the method including: detecting, via at least one asset included in a wireless device network, at least one candidate asset attempting to enter the wireless device network from an external network, wherein a spectrum access protocol of the wireless device network is different from a spectrum access protocol of the external network; constructing a spectrum profile for the wireless device network based on metadata for transactions between assets in the wireless device network, wherein at least one asset in the wireless device network includes a blockchain for recording the metadata for transactions between assets in the wireless data network; applying an access policy including the spectrum profile to the at least one candidate asset within the wireless device network; and admitting the at least one candidate asset to the wireless device network in response to applying the access policy to the at least one candidate asset.

A second aspect of the disclosure provides a computer program product stored on a computer readable storage medium, the computer program product including program code, which, when being executed by at least one computing device, causes the at least one computing device to: detect, via at least one asset included in a wireless device network, at least one candidate asset attempting to enter the wireless device network from an external network, wherein a spectrum access protocol of the wireless device network is different from a spectrum access protocol of the external network; construct a spectrum profile for the wireless device network based on metadata for transactions between assets in the wireless device network, wherein at least one asset in the wireless device network includes a blockchain for recording the metadata for transactions between assets in the wireless data network; apply an access policy including the spectrum profile to the at least one candidate asset within the wireless device network; and admitting the at least one candidate asset to the wireless device network in response to applying the access policy to the at least one candidate asset.

A third aspect of the disclosure provides a system having at least one computing device configured to perform a method by performing actions including: detecting, via at least one asset included in a wireless device network, at least one candidate asset attempting to enter the wireless device network from an external network, wherein a spectrum access protocol of the wireless device network is different from a spectrum access protocol of the external network; constructing a spectrum profile for the wireless device network based on metadata for transactions between assets in the wireless device network, wherein at least one asset in the wireless device network includes a blockchain for recording the metadata for transactions between assets in the wireless data network; applying an access policy including the spectrum profile to the at least one candidate asset within the wireless device network; and admitting the at least one candidate asset to the wireless device network in response to applying the access policy to the at least one candidate asset.

BRIEF DESCRIPTION OF THE DRAWINGS

It is noted that the drawings of the disclosure are not to scale. The drawings are intended to depict only typical aspects of the disclosure, and therefore should not be considered as limiting the scope of the disclosure. In the drawings, like numbering represents like elements between the drawings.

DETAILED DESCRIPTION

Figure 1:
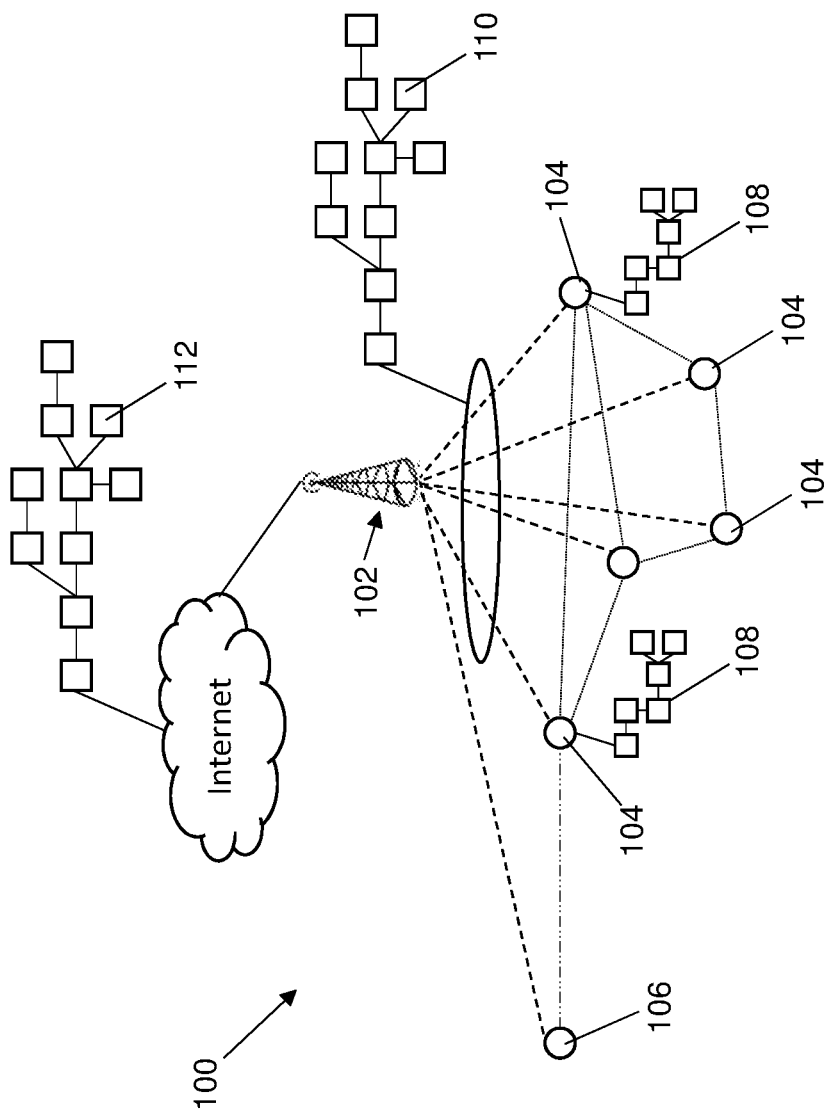
FIG. 1 provides a schematic view of a system for adjudicating access policies according to embodiments of the disclosure.

With the increasing use of the electromagnetic spectrum for communication, driven largely by the consumer devices such as smartphones, the emerging internet of things (IoT) connected devices and looming autonomous machines (drones, robots, vehicles and other such systems), comes spectrum congestion and degraded wireless communication performance. This is true for both licensed users as well as unlicensed spectrum use. Methods for "fair" use of local spectrum has previously been attempted, e.g., in U.S. Pat. No. 8,818,293 (incorporated herein by reference), while U.S. Pat. No. 9,565,658 (incorporated herein by reference) discusses intelligent control hosted at a control point for managing the use of spectrum in a shared manner with a licensed holder based on observation and statistics. U.S. Pat. No. 7,881,340 (incorporated herein by reference), describes methods for decentralized control for access based on cooperation around a metric such as time.

No conventional technologies have attempted to manage spectrum use with respect to all stakeholder interests, e.g., regulatory, local law, heterogeneous radio node, priority, auditable use, assured client access and/or transient node anomaly incorporation. Therefore there is a need in the art for a system and method that allows for a dynamic and distributed control plane that accomplishes the proper integration of local and global DSA policy and rules to the granularity of the client radio capabilities in a manner that is accountable and assured. Additionally, there is a need for the ontology of the spectrum use to be preserved for audit and forensic purposes even at a transient, one-time, minimal wireless transaction.

Conventional tools have not been sufficient to provide these features. U.S. Pat. No. 9,608,829 (incorporated herein by reference), for example, discusses a method for achieving additional granularity under a main digital ledger that claims to allow customized decentralized database within a network and adapt to changing circumstances allowing for tracking of records and monetization associated with such. Though the SDR technologies have been used previously, the lack of ability to enforce policy and address individual use have limited the deployment. The rapid expansion of wireless connectivity in Internet of Things ("IoT") deployments demands that the spectrum, a limited resource, is used most efficiently. Conventional technologies have failed to provide a localized dynamic wireless ontology for, and subsequent use of, DSA that ensures compliance of an entering and/or existing asset to all stakeholder requirements. Conventional systems have not met this challenge, e.g., by continuing to include various components that have at most a limited ability to function with recent developments in cross network layer technology.

In general terms, methods and systems according to the disclosure may operate, e.g., by using existing assets in a wireless device network to detect at least one asset seeking to enter the wireless device network. Upon detecting a candidate asset, an existing asset on the network may construct a spectrum profile for the wireless device network based on metadata for transactions between other, existing assets in the wireless device network. The existing assets then may create an access policy which incorporates the spectrum policy and other access criteria for admitting candidate assets to the wireless device network, e.g., as recorded in distributed ledgers for a specific network and/or global ledgers applicable to multiple networks. An adjudication manager of at least one existing asset may apply the access policy to the candidate asset to determine whether the candidate asset will operate successfully on the wireless device network. The candidate asset will be admitted to the wireless device network upon successful application of the access policy. In further embodiments, the disclosure includes further analysis of the admitted candidate asset for continued compliance with the access policy and/or other requirements.

In the description, reference is made to the accompanying drawings that form a part thereof, and in which is shown by way of illustration specific exemplary embodiments in which the present teachings may be practiced. These embodiments are described in sufficient detail to enable those skilled in the art to practice the present teachings and it is to be understood that other embodiments may be utilized and that changes may be made without departing from the scope of the present teachings. The description is, therefore, merely exemplary.

Referring to FIG. 1, embodiments of the disclosure provide a system 100 for managing access policies to adjudicate admission of candidate assets to a distributed wireless device network (simply "network" hereafter) 102. Network 102 may include one or more existing network assets (simply "assets" hereafter) 104 in communication with each other over network 102. Each asset 104 may represent one or more devices capable of communicatively exchanging data with other assets 104 via network 102, e.g., phones, tablets, personal computers, and/or any other conceivable device configured for network communication. Asset(s) 104 of network 102 each may include a memory or similar storage system for storing and retrieving information, e.g., data and metadata. Metadata refers to a category of data for recording information about other data, e.g., dates of recordation, filenames, statistical data, etc.

Embodiments of the disclosure are operable to use assets 104 of network 102 to determine whether to admit new assets 104 to network 102, without immediate intervention by a central controller and/or other device for centrally managing network 102. A candidate asset 106 is shown as being within the detectable range of network 102, but not currently exchanging data with other assets 104 via network 102. In the example of FIG. 1, network 102 is geographically defined, but it is understood that network 102 may not be limited by geography. Network 102 may have a Dynamic Spectrum Access (DSA) policy which governs available frequencies that each asset is permitted to use within network 102. When candidate asset 106 initially requests access to network 102, it is unknown whether candidate asset 106 will comply with the DSA of network 102 upon being admitted. DSA of network 102 may define several requirements for communication and thus can specify methodology and/or other requirements for the use of a frequency spectrum in network 102. Technical challenges of network access may also include requirements that are defined by entities outside network 102, e.g., one or more governments, network administrators, and/or other rule defining entities. In many instances, network 102 may not have any prior knowledge of candidate asset 106 and candidate asset 106 likewise may not have significant information regarding the DSA policy for network 102. According to embodiments, one or more assets 104 of network 102 may include features and/or may implement methodologies to adjudicate, optionally without intervention by a central network controller, whether candidate asset(s) 106 will be admitted to network 102. Although some asset(s) 104 may lack this capability, e.g., by being an existing legacy non-agile wireless device operating within 102 network, embodiments of the disclosure are capable of implementation via a control plane defined within or distributed across other asset(s) 104. Advantages of the present disclosure may allow a network administrator and/or one or more users in the network to manage and enforce network access policies relevant to all stakeholders via asset(s) 104 operating independently, regardless of whether all assets 104 (e.g., nodes and/or devices in network 102) include tools, modules, etc., for managing such access.

To implement embodiments of the disclosure, network 102 may include one or more assets 104 with memory for recording a blockchain 108 indicative of the DSA policy for network 102 and/or other requirements for adjudicating a request to access network 102. The term "blockchain" refers to a specific type of data or metadata recorded as a growing list of records, called blocks, which are linked to each other using cryptography. It is possible for multiple blocks to depend from a single block, with diverging chains within blockchain 108 being referred to as "sidechains." Each block is associated with a cryptographic hash of the previous block, timestamp, and transaction data for the block. Although only two assets 104 in network 102 are explicitly shown to include blockchain 108 in FIG. 1, this is solely for ease of illustration. It is possible for only one, multiple, or all assets 104 in network 102 to include respective blockchains 108 in various embodiments. Each blockchain 108 is used to maintain a distributed ledger 110 via cloud computing over network 102, and local sidechains within blockchain 108 are maintained within network 102. Every transaction (i.e., adjudication of a given candidate node 106) may be defined as an additional stakeholder requirement for network 102 via distributed ledger 110. Within blockchain 108 of each asset 104, lesser sidechains are tailored to be within the capability of process and memory within asset 104 itself. Simple transactions based on lower layer network interaction may be built into a customized sidechain for asset 104 reflecting its DSA compliance and audit trail. To effectively audit each asset 104 and ensure continual compliance, asset(s) 104 may use various types of metadata to build a spectrum profile including, e.g., spatial data, temporal data, and/or spectral data in node negotiations, and may incorporate these types of data into blockchain 108. The metadata incorporated into blockchain 108 may also include time and location-based data. Temporal and spatial data is collected via updates to blockchain 108 as needed for synchronization between assets 104 and direction of network traffic respectively. Spectral metadata is acquired as assets 104 broker exchanges into and within network 102. Distributed ledger 110 may be continuously transmitted to a global ledger 112 via the internet, such that global ledger 112 may routinely update and modify distributed ledger 110 and blockchain 108 where appropriate.

In system 100, spectrum profiles are initially generated locally at each asset 104 by compiling a local set of metadata. The metadata for constructing a spectrum access profile may be generated through the sensing of the local electromagnetic operating environment and the monitoring of network parameters and/or network statistics via blockchain 108. An example process for constructing a spectrum profile is to locally collect the priority frequency band signal metadata, e.g., Signal to Noise Ratio (SNR), Receive Signal Strength Indicator (RSSI), and/or in-band and out-of-band power levels for asset(s) 104 or other portions of network 102. The frequency band signal data may be aggregated with the network ontology data such as packet round trip time, Bit error rates, number of correctly received bits, Jitter, latency, and node busyness measured at various assets 104. However generated, the metadata may be compiled at asset(s) 104 into blockchain 108 and adjudicated against quality of service (QoS) and/or service application requirements, governance, and regulations of network 102 to ensure compliance. Such requirements may be stored, e.g., elsewhere in blockchain 108, within distributed ledger 100, and/or within global ledger 112.

FIG. 1 illustrates network 102 as a distributed network of assets 104, each of which may include corresponding blockchain(s) 108, to demonstrate how a multi-tier digital ledger system is operable to adjudicate the granting or denial of access to candidate assets 106. In the example of FIG. 1, system includes tiers of digital ledgers and/or blockchain(s) 108, 110, 112. Each asset 104 is capable of managing and generating local metadata via its own blockchain 108. This local metadata is aggregated across network 102 and updated via distributed ledger 110. Regulatory data is managed and aggregated to the network level across network 102, and other networks 102 (not shown) via global ledger 112.

Figure 2:
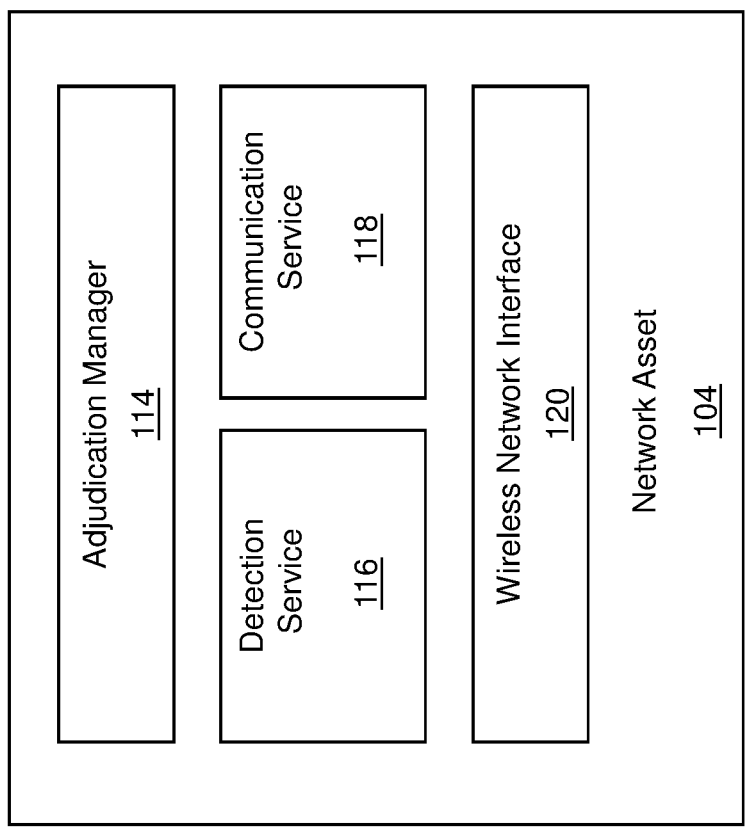
FIG. 2 illustrates a schematic view of an illustrative network asset with example subcomponents according to embodiments of the disclosure.

FIG. 2 provides a schematic view of an example asset 104 of network 102. Asset 104 includes various subcomponents for adjudicating the admission of denial of candidate asset(s) 106 (FIG. 1) to network 102 (FIG. 1) as described herein. Network asset 104 may take the form of any conceivable computing device having a processor and memory configured to perform various functions. In still further embodiments, network asset 104 may include multiple computing devices and/or sub-computing devices configured to perform various functions independently, as part of a distinct asset 104 on network 102.

Each asset 104 may include a combination of software and hardware to provide, e.g., an adjudication manager 114 for controlling whether candidate asset(s) 106 (FIG. 1) will be granted access to network 102 (FIG. 1), a detection service 116 for detecting whether any candidate asset(s) 106 seek to access network 102, a communication service 118 for communicating with other assets on network 102, and a wireless network interface 120 to provide access to the internet and/or various forms of external media. These computer programs may work independently and/or in conjunction with each other to regulate the admission or denial of candidate assets 106 to provide a protected, controllable, auditable, Quality of Service (QoS) aware wireless communication or data exchanging network environment.

Adjudication manager 114 of network asset 104 may provide, e.g., features for automated policy management which integrates the DSA policy of network 102 with regulatory and stakeholder requirements. Adjudication manager 104 may be responsible for integrating metadata and policies from each of blockchain 108, distributed ledger 110 and/or global ledger 112 for automated policy management. Adjudication manager 104 will also automatically output spectrum access rules to a spectrum dependent radio system for network access 104. In another non-limiting example, adjudication manager 114 may enable validation feedback to authorized regulators and stakeholders in communication with network 102, e.g., via the internet, to allow validation by spectrum regulators and stakeholders. Method details for how adjudication manager 114 may provide these features are described elsewhere herein, e.g., relative to FIGS. 3 and 7.

Network asset 104 may include various other components, which may take the form of hardware and/or software, for providing communication with other devices via network 104 and/or other data connections. Detection service 116 may include hardware components (e.g., near-field communication, wireless fidelity (Wi-Fi) networking, wired connections, etc.) and/or associated algorithms for identifying candidate asset(s) 106 seeking to access network 102. Detection service 116 further may include a suite of sensing algorithms and data fusion functions to collect, parse, and define, with a specifically adaptable fidelity, the electromagnetic operating environment where candidate asset(s) 106 may be detectable. Communication service 118 may provide an adaptable wireless and/or wired communications infrastructure to instantiate wireless data transactions via network 102. These transactions include, but are not limited to, video, voice, text, and/or network metadata. Communication service 118 may take the form of any currently known or later developed communications infrastructure for enabling communication between assets 104 of network 102, and between asset(s) 104 and other devices included on network 102. Asset(s) 104 may also include wireless network interface 120 to enable communications and/or access between asset(s) 104 and devices outside network 102. Wireless network interface may work in conjunction with spectrum requirements and/or various limiting factors of the spectrum dependent system hardware. For example, rules and policies generated by adjudication manager 114 may include provisions pertaining to radio systems frequency ranges such that no policies and/or rules will be validated to request a radio system tune outside its operating range(s).

Figure 3:
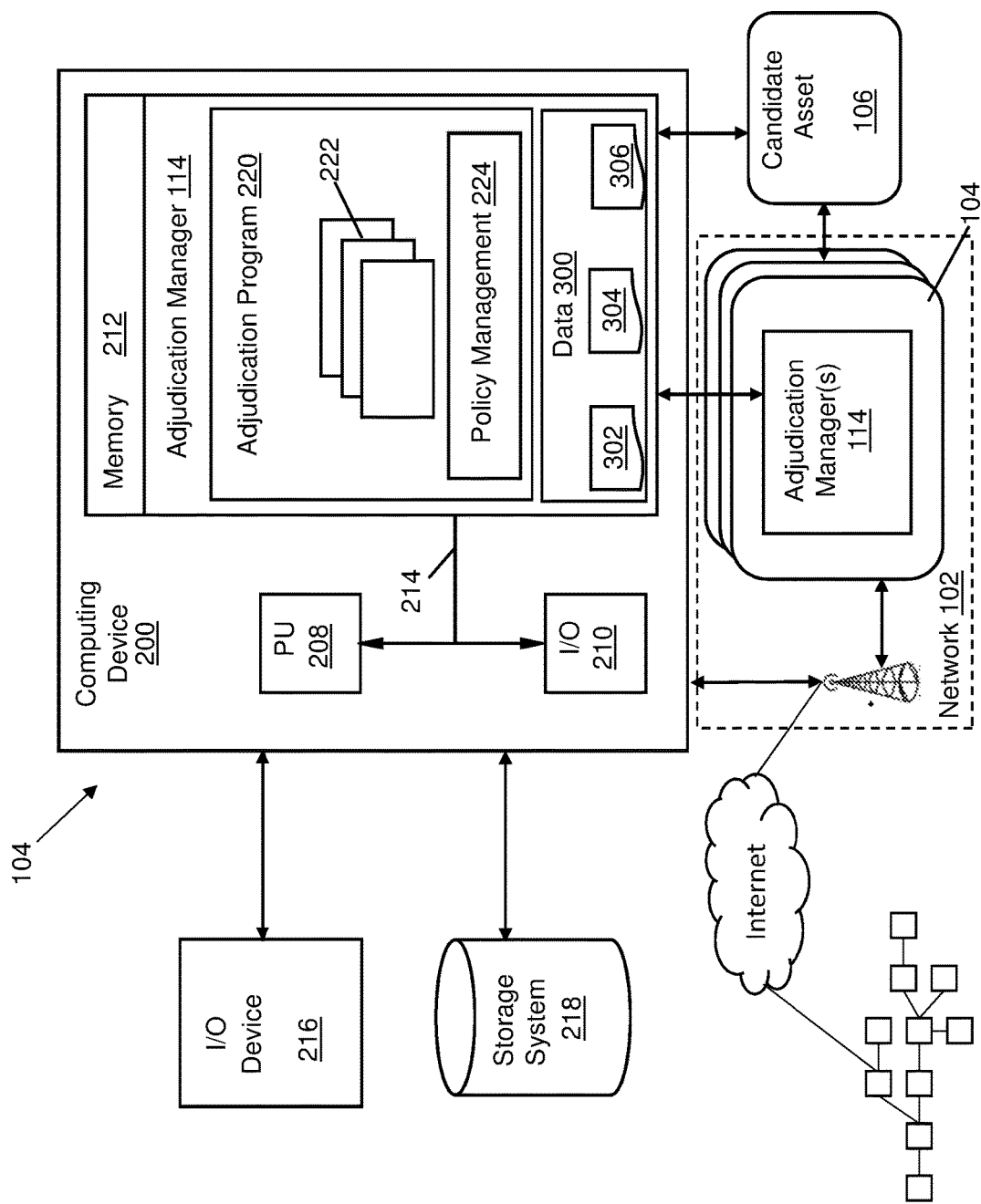
FIG. 3 shows a schematic view of an illustrative environment for adjudicating access policies in a wireless device network according to embodiments of the disclosure.

Turning to FIG. 3, embodiments of the disclosure may be implemented through the use of a computing device 200. Computing device 200 may be integrated into network asset(s) 104 and/or other components described herein, or may be an independent component connected to one or more devices within network 102. According to another example, computing device 200 may be connected to or otherwise part of asset(s) 104. Computing device 200 is shown connected to network 102, multiple assets 104, and candidate asset 106 in the example embodiment shown in FIG. 3. Computing device 200 may include a processor unit (PU) 208, an input/output (I/O) interface 210, a memory 212, and a bus 214. Further, computing device 200 is shown in communication with an external I/O device 216 and a storage system 218. External I/O device 216 may be embodied as any component for allowing user interaction with computing device 200. Adjudication manager 114 may be included wholly or partially within memory 212 of computing device 200, which in turn may represent at least a portion of one asset 104. Adjudication manager 114 can execute an adjudication program 220, which in turn can include various modules 222, e.g., one or more software components configured to perform different actions, including without limitation: a calculator, a determinator, a comparator, etc. Modules 222 can implement any currently known or later developed analysis technique for adjudicating whether to permit or deny access of candidate asset 106 to network 102. As shown, computing device 200 may be in communication with other assets 104 for sending and/or receiving various forms of data to implement the functions of adjudication manager 114. Thus, computing device 200 in some cases may operate as a part of each asset 104, while in other cases the same computing device 200 may be an intermediate component (i.e., communication device 110) between two or more assets 104.

Modules 222 of adjudication manager 114 can use calculations, look up tables, and similar tools stored in memory 212 for processing, analyzing, and operating on data to perform their respective functions. In general, PU 208 can execute computer program code, such as "NMS 206," which can be stored in memory 212 and/or storage system 218. While executing computer program code, PU 208 can read and/or write data to or from memory 212, storage system 218, and/or I/O interface 210. Bus 214 can provide a communications link between each of the components in computing device 200. I/O device 216 can comprise any device that enables a user to interact with computing device 200 or any device that enables computing device 200 to communicate with the equipment described herein and/or other computing devices. I/O device 216 (including but not limited to keyboards, displays, pointing devices, etc.) can be coupled to asset(s) 104/computing device 200 either directly or through intervening I/O controllers (not shown).

Memory 212 can include a cache of data 300 organized for reference by adjudication manager 114. As discussed elsewhere herein, computing device 200 can send, receive, and/or rely various types of data 300, including metadata pertaining to other devices of network 102. Data 300 thus may be classified into multiple fields and, where desired, sub-fields within each field of data 300. Data 300 may be provided to and/or from asset 104, e.g., via network 102 and/or I/O device 216. To exchange data between multiple assets 104, computer system 200 may be communicatively connected to other communication features of asset 104 (e.g., detection service 116 (FIG. 2), communication service 118 (FIG. 2) and/or wireless network interface 120 (FIG. 2)). In some cases, these communication features may also be contained within memory 212 of computer system 200.

Communications data 300 can optionally be organized into a group of fields. In some cases, communications data 300 may include various fields indicative of requirements for being admitted to, and operating within, network 102 after candidate device 106 is admitted thereto. For example, communications data 300 may include spectrum profile metadata 302 for defining acceptable frequencies, bandwidths, power consumption characteristics, signal modulations, packet overhead, other waveform properties, etc. In an example embodiment, blockchain 108 (FIG. 1) may be configured to store spectrum profile metadata 302. Data 300 may also include transaction metadata 304 including, e.g., spatial, temporal, spectral, and security characteristics of network 102. In an example embodiment, distributed ledger 110 (FIG. 1) may be configured to store transaction metadata 304. Data 300 may also include regulatory and stakeholder metadata (simply "regulatory metadata" hereafter) 306 including, e.g., Federal Communications Commission (FCC) and National Telecommunications and Information Administration (NTIA) access rules and/or decisions, user requirements, and others. Each type of data 300, however embodied, may be accessible to a policy management program 224, which in turn may operate as a sub-program within adjudication program 220. Data 300 may be mixed and parsed using policy management program 224 as it interfaces with a local static database, e.g., via the internet, to store regulatory and stakeholder access decisions. Policy management program 224 thus may output spectrum access rules directly to asset(s) 104 and/or candidate asset(s) 106, and may permit regulatory and stakeholder validation feedback triggers via internet communication.

Computing device 200, and/or asset(s) 104 which include computing device 200 thereon, may comprise any general purpose computing article of manufacture for executing computer program code installed by a user (e.g., a personal computer, server, handheld device, etc.). However, it is understood that computing device 200 is only representative of various possible equivalent computing devices that may perform the various process steps of the disclosure. To this extent, in other embodiments, computing device 200 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. In one embodiment, computing device 200 may include a program product stored on a computer readable storage device, which can be operative to adjudicate requests from candidate asset(s) 106 for admission to network 102.

Figure 4:
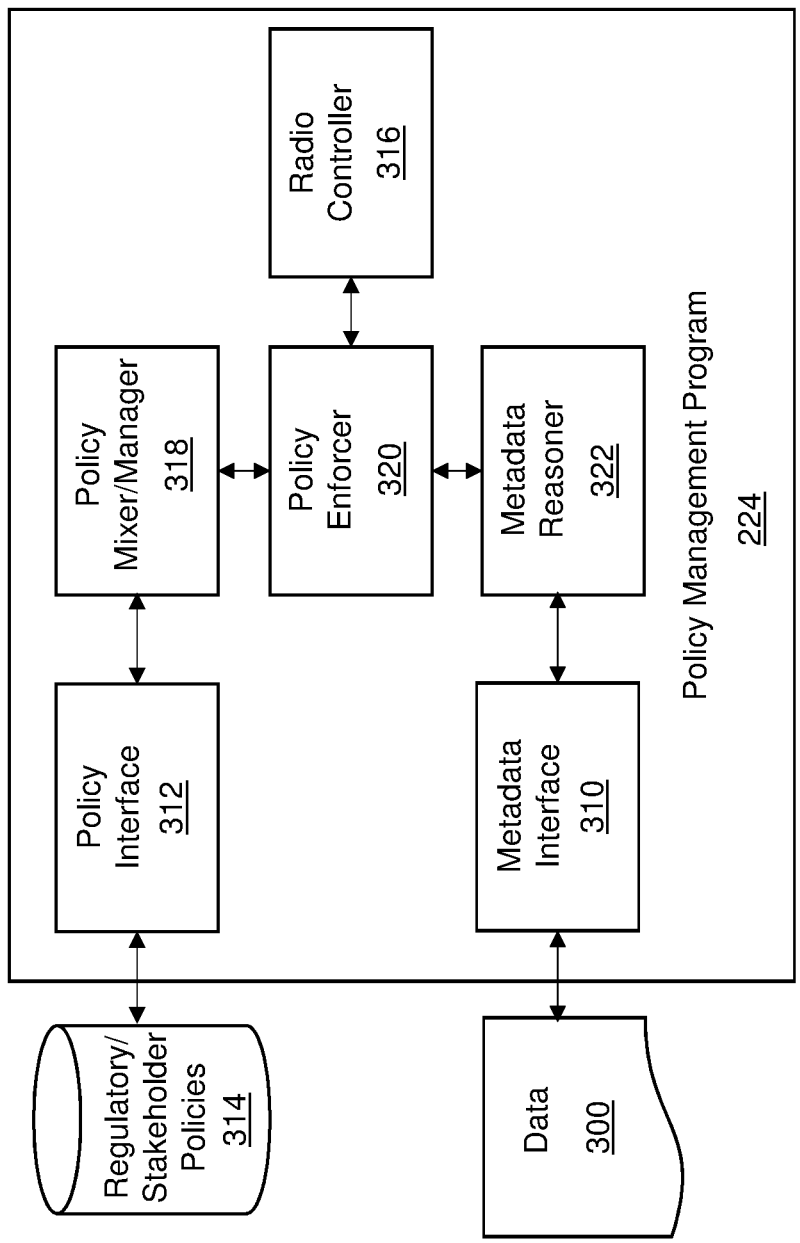
FIG. 4 shows a schematic view of a policy management program and sub-modules thereof according to embodiments of the disclosure.

FIG. 4 provides a schematic view of policy management program 224 illustrating policy manager program 224 as a submodule of the adjudication program 114 (FIG. 2). Policy management program 224 operates to generate and enforce network service requirements to adjudicate whether candidate asset(s) 106 will be admitted to network 102. Additionally, policy management program 224 may notify user(s) of network 102 as well as regulators and stakeholders of network conditions. Policy management program 224 may refer to and/or act on data 300, including digital ledger metadata from various digital ledgers and/or blockchains 108, 110, 112 (FIG. 1) via a metadata interface 310. Policy management program 224 similarly may use a policy interface 312 to access and use regulatory and stakeholder policy database(s) 314, which may be accessible via internet and/or otherwise stored in memory 212 (FIG. 3) of asset(s) 104. Policy management program 224 may also include a radio controller 316 to access and operate a spectrum dependent system. Radio controller 316 may define all or part of a software defined radio (SDR), and thus may be responsible for accessing a front end of asset(s) 104 and/or data plane via applications that do not require radio certification. Radio controller 316 may run procedures to set the configuration of radio hardware and/or software, make requests to gather radio metrics, gather spectrum data, pull location information, and asses radio capabilities.

Policy management program 224 may additionally include various subcomponents or sub-modules for allowing communication between metadata interface 310, policy interface 312, and/or radio controller 316. Example subcomponents of policy management program 224 may include, e.g., a policy mixer/manager module 318, a policy enforcer module 320, and/or a metadata reasoner module 322. Policy mixer/manager module 318 provides policy verifications and authorizations within asset 104 for policies transmitted from regulator and/or stakeholder policy database 314. Policy mixer/manager 318 can make quality of service (QoS) decisions based on optimization rulesets and the generation of conformance parameters, update and load new policies, request transmission parameter approvals, and/or collect QoS metrics from the radio operations undertaken via radio controller 316. Policy enforcer module 320 can monitor requests for transmission requirements, policy changes, and rulesets, issues and track radio control operations undertaken with radio controller 316, and ensure policy compliance during operation of asset(s) 104. Metadata reasoner module 322 may resolve conflicts between not-agreeing metadata using predetermined conflict resolution methods, fuse and/or parse all received forms of data 300, and/or operate as a node-local data storage for data 300, including each type of metadata described herein.

Figure 5:
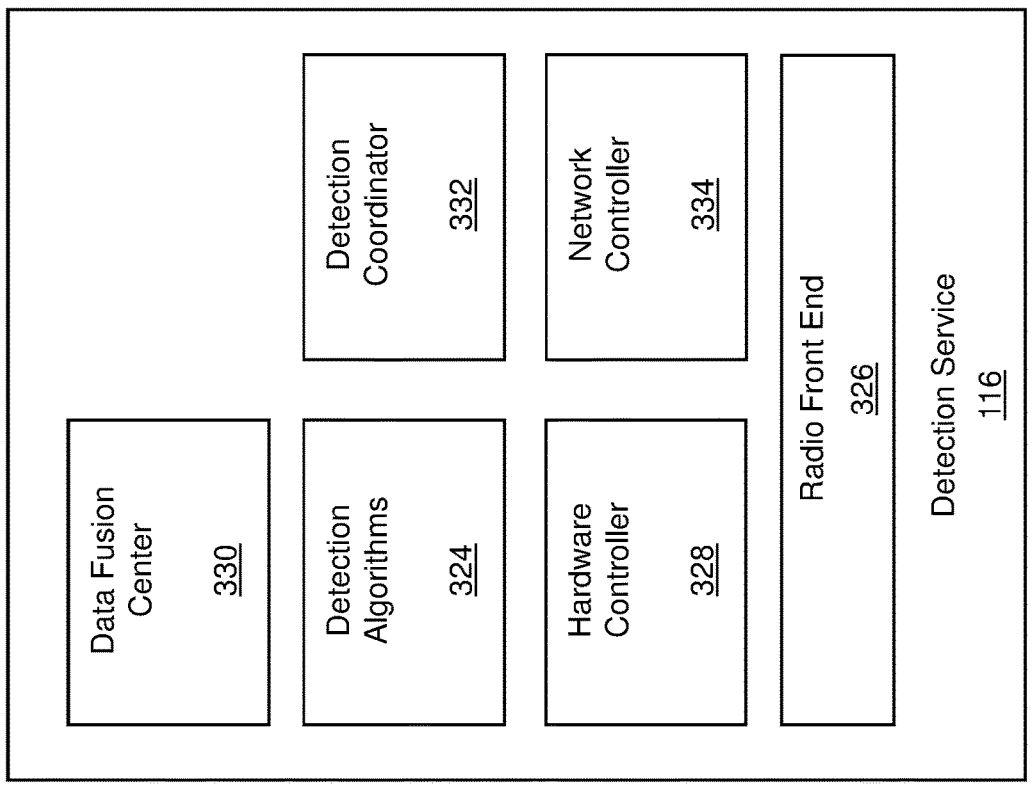
FIG. 5 shows a schematic view of a communication service operating on a network asset according to embodiments of the disclosure.

FIG. 5 provides a schematic view of detection service for asset(s) 104, and subcomponents thereof. Detection service 116 may be provided on a computing device in communication with adjudication program 114 and/or asset(s) 104, or may be a wholly or partially independent component of network 102. As shown in FIG. 5, detection service 116 is configured to detect candidate asset(s) 106 desiring to operate on network 102, and thus may include various subcomponents for collecting, parsing, and/or defining, with a specifically adaptable fidelity, the electromagnetic operating environment for candidate asset(s) 106 before they may be admitted to network 102. Detection service 116 may extract spectrum data for candidate asset(s) 106 using detection algorithm(s) 324 via a radio front end 326 that is controlled by a hardware controller module 328. Once spectrum data for candidate asset(s) 106 has been collected it may be managed, parsed, and stored in a data fusion center 330, e.g., a subdivision of memory 212 (FIG. 3) configured for combining the incoming spectrum data with relevant data of network 102 and/or asset(s) 104 for analysis. A detection coordinator 332 may coordinate data transaction arising from each detected candidate asset 106. A network controller 334 may thereafter transmit the transaction data for each candidate asset 106 to other asset(s) 104 and/or other components of network 102 via radio front end 326.

Figure 6:
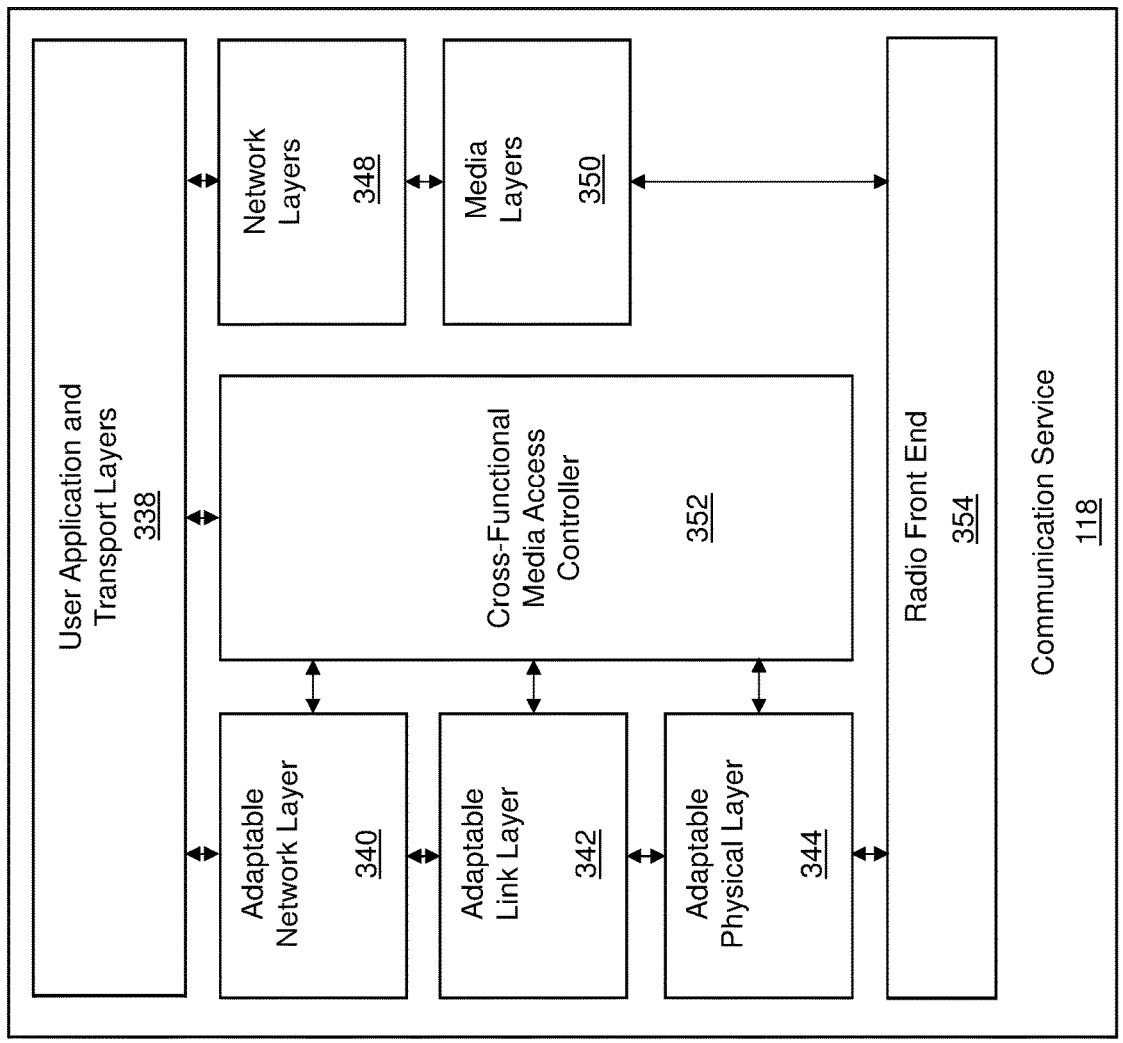
FIG. 6 shows a schematic view of a detection service operating on a network asset according to embodiments of the disclosure.

FIG. 6 provides a schematic view of communication service 118 and various sub-components thereof. Communication service 118 may be configured to provide an adaptable wireless communications infrastructure needed for completing any of the various wireless data exchange transactions in embodiments of the disclosure.

Communication service 118 may provide, e.g., an adaptable high throughput ultra-low latency data plane with various sub-modules, e.g., user application and transport layers 338, an adaptable network layer 340, an adaptable link layer 342, and/or an adaptable physical layer 344 in combination with conventional network layers 348 and/or conventional media layers 350. Communication service 118 may also include, e.g., a cross-functional media access controller 352, and/or a radio front end 354. Radio front end may be independent from radio front end 326 of detection service 116 (FIGS. 1, 5), or in some cases may be part of radio front end 326. Network and media layers 348, 360 of communication service may be used to transport each type of data 300 (FIGS. 1, 3, 4) across network 102, and may allow for transactions and/or exchange of information with global ledger 112. Adaptable layers 340, 342, 344 by contrast are prioritized to meet QoS requirements based on the service requirements of user applications on asset(s) 104 and/or candidate asset(s) 106. User applications on asset(s) 104 and/or candidate asset(s) 106 may provide cross-functional media access controller 352 with intended service parameters, thereby allowing controller 352 to make optimization decisions in terms of how communication service 118 may optimize QoS, regulations, and user requirements. For example, adaptable network layer 340 will have the ability to switch between a TCP/IP service and/or a UDP service during run time. Adaptable link layer 342 may have the ability to configure itself for Time Division Multiple Access (TDMA) or Code Division Multiple Access (CDMA). Adaptable physical layer 344 may have the ability to provide Orthogonal Frequency Division Multiplexing (OFDM) or Binary Phase Shift Keying (BPSK). Cross-functional access controller 352 thus may provide cross-layer mechanisms to allow for reconfiguration of each sub-component in communication service 118 while performing consistent monitoring of the QoS, regulations, and user requirements for network 102.

Figure 7:
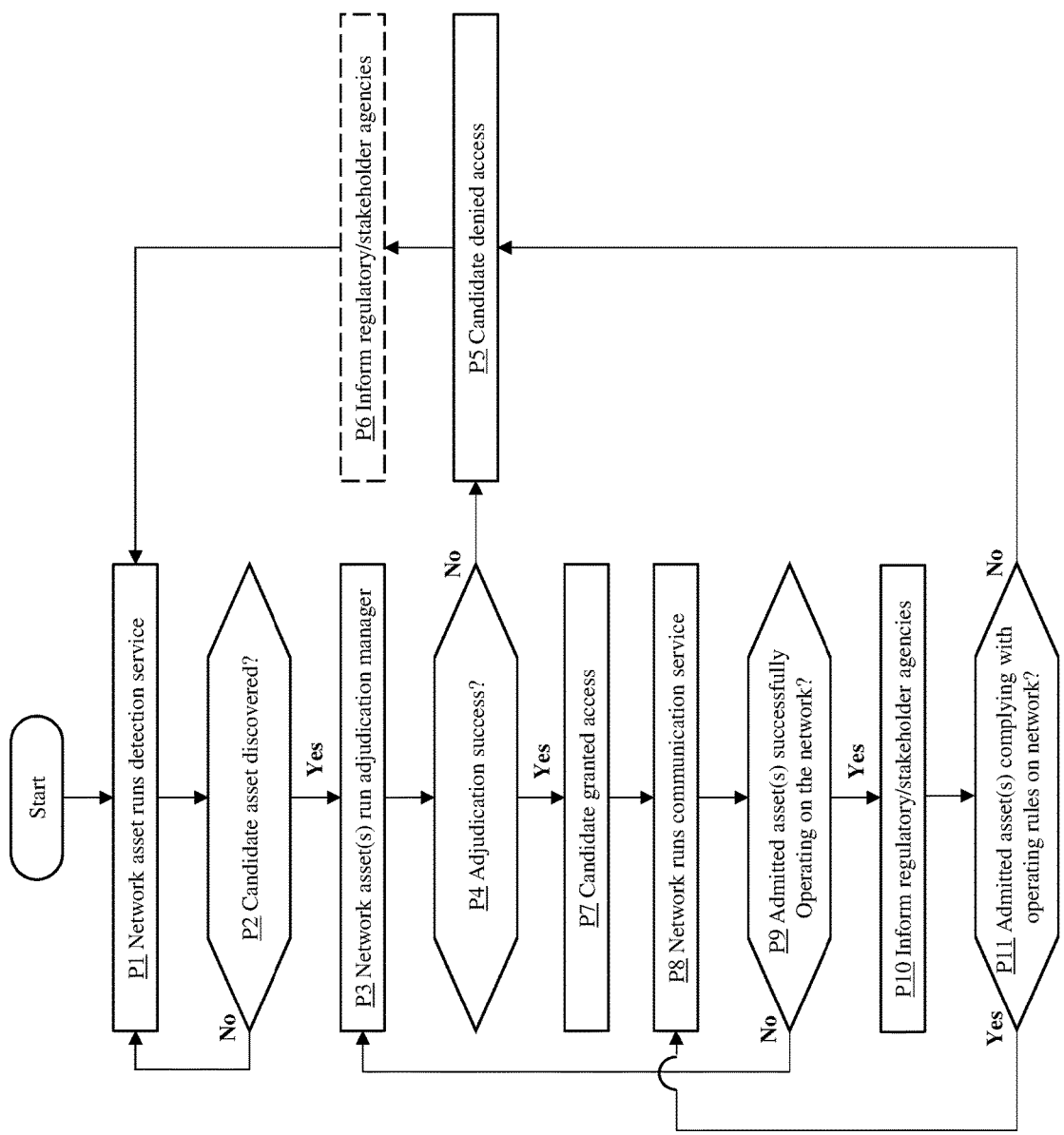
FIG. 7 shows an illustrative flow diagram for implementing methods according to embodiments of the disclosure.

Referring now to FIG. 7, with continued reference to FIGS. 2-6, embodiments of the disclosure provide a method for managing access policies to determine whether candidate asset(s) 106 will be allowed access to network 102. A generalized method according to the disclosure may include, e.g., using asset(s) 104 to detect at least one candidate asset 106 attempting to enter network 102 from an external network, constructing a spectrum profile for network 102 based on metadata for transactions between other asset(s) 104 within network 102, applying the access policy with the spectrum profile to candidate asset(s) 106, and admitting candidate asset(s) 106 to network 102 in response to successfully applying the access policy. These processes may include various sub-processes and additional steps, and an example method according to the disclosure is discussed herein.

After beginning the operation of adjudication program 114 ("Start" in FIG. 7), methods according to the disclosure may include process P1 of causing one or more asset(s) 104 to run detection service 116 (FIGS. 2, 5). Detection service 116 may operate over periodic intervals and/or may operate continuously as described herein. At process P2, detection service 116 may inform adjudication service 114 of whether any candidate asset(s) 106 are discovered and seek to enter network 102. Where no candidate asset(s) 106 are detected (i.e., "No" at process P2), the method may return to process P1 of continuing to operate detection service 116. In the event that at least one candidate asset 106 is discovered (i.e., "Yes" at process P2), the method may proceed to further processes P3-P11 of using asset(s) 104 to create an access policy for network 102, and grant or deny access to candidate asset(s) 106. In some implementations of process P2, each asset 104 is running the detection service 116 while idle or at predetermined intervals that minimize and lag time for node operations. From the detection service 116, each asset 104 may calculate and/or recalculate the spectral conditions spatial to their location using hardware controller 328 (FIG. 5) to "direct" radio front end 326 (FIG. 5) to collect spectrum statistics according to detection algorithms 324 (FIG. 5) and storing the metadata in various fields 302, 304, 306 of data 300. This information is shared amongst assets 104 of network 102 as metadata via detection coordinator 332 (FIG. 5). Candidate asset(s) 106 may be discovered by direct requests transmitted network 102, e.g., using network layers 348 (FIG. 6) and/or media layers 350 (FIG. 6) in communication service 118 (FIGS. 2, 6) or via metadata transmitted from detection service 116. In any case, network 102 may then initiate adjudication service 114 to adjudicate whether candidate asset(s) 106 will be authorized and able to use the communication service of network 102.

Adjudication manager 114 may operate in further steps to define an access policy of network 102 for candidate asset(s) 106, and adjudicate whether candidate asset(s) 106 will be granted access to network 102. At process P3, one or more asset(s) 104 will begin operating adjudication manager 114 to with respect to candidate asset(s) 106 discovered in process P2. Before process P3 begins, adjudication manager 114 may operate in a dormant mode or, in some cases, may be non-operational until being triggered by detection service 116. A technical benefit to methods of the disclosure is that candidate asset(s) 106 may initially be admitted to network 102 quickly without authorization by a central controller using security features of digital ledgers and/or blockchain (s) 108, 110, 112 and corresponding metadata. Adjudication manager 114 thus provides consistent spectrum management, cyber protection, and/or monetization features across network 102 while permitting consistent variations between admitted assets 104.

In process P3, adjudication manager 114 may use metadata stored within data 300 field of memory 212 to determine whether candidate asset(s) 106 under analysis will comply with regulatory and stakeholder requirements, as well as technical requirements, if granted access to network 102. To adjudicate candidate asset(s) 106 in process P3, adjudication manager may refer to and/or use information from spectrum profile metadata 302, transaction metadata 304, and/or regulatory metadata 306 accessible via memory 212, and/or the same or similar data as recorded in digital ledgers and/or blockchains 108, 110, 112 (FIG. 1). Each type of referenced metadata may be indicative of spatial, temporal, and/or spectral policies, and/or other requirements including radio access rules where applicable. In some cases, adjudication manager 114 may compile each available form of metadata into an initial spectrum profile and access policy for candidate asset(s) 106. As noted elsewhere herein, constructing a spectrum profile may include, e.g., compiling and/or measuring parameters such as the SNR, RSSI, and in-band and out-of-band power levels for asset(s) 104 and/or other portions of network 102. Frequency band signal data may be aggregated with the network ontology data including, e.g., packet round trip time, Bit error rates, number of correctly received bits, Jitter, latency, and/or node busyness measured at various assets 104. Such data may be recorded in blockchain 108 and adjudicated against quality of service (QoS) and/or service application requirements, governance, and regulations of network 102 to ensure compliance. In some cases, adjudication manager 114 may continuously monitor data 300 and digital ledgers and/or blockchains 108, 110, 112 to prepare a spectrum profile and access policy to be used when adjudicating candidate asset(s) 106.

At process P4, adjudication manager 114 can evaluate whether candidate asset 106 is capable of operating under the terms of the constructed access policy, including its spectrum profile(s) for available communication across network 102. The constructed access policy may represent, e.g., regulatory and stakeholder requirements while the spectrum profile(s) more specifically characterize the technical capabilities of network 102. Where candidate asset(s) 106 is capable of compliance (i.e., "Yes" at process P4), candidate asset(s) 106 is/are granted access to network 102 and additionally may become new platforms for communication service 118 (FIG. 6) to become a contributing member of network 102 capable of adjudicating new assets. Where candidate asset(s) 106 are not capable of compliance (i.e., "No" at process P4), candidate asset(s) 106 will not be allowed to operate on network 102. At this stage, a user of candidate asset(s) 106 may be informed of the denial and prompted to make appropriate changes in technical and/or other settings. Thereafter, the method optionally may proceed to process P6 (shown in phantom as optional) of informing regulatory and/or stakeholder agencies that candidate asset(s) 106 attempted to access network 102. The method may then return to process P1 for adjudication of other candidate asset(s) 106.

At process P7, candidate asset(s) 106 which comply with required access policies and spectrum profiles become asset(s) 104 of network 102. Proceeding to process P8, asset(s) 104 and/or a central controller of network 102 may access newly admitted asset(s) 104 on network 102 to provide, install, and/or otherwise modify communication service(s) 118 (FIG. 6) on the newly admitted asset(s) 104. Candidate asset(s) 106 which become asset(s) 104 of network 102 are autonomously monitored for further compliance with the regulatory and stakeholder requirements. At process P9, adjudication manager 114 may determine whether all asset(s) 104, or a subset of asset(s) 104 such as newly admitted devices, are successfully operating on network 102 and/or continuing to abide by the policies and rules. Where adjudication manager 114 detects non-compliance (i.e., "No" at process P9), non-compliant asset(s) 104 may revert to being candidate asset(s) 106 and process P3 may be re-implemented to determine whether to re-admit candidate asset(s) 106 to network 102. In cases where adjudication manager 114 detects continued compliance (i.e., "Yes" at process P9), adjudication manager 114 may inform one or more regulatory and/or stakeholder agencies of the admitted asset(s) 104 at process P10.

Even after asset(s) 104 have been granted access to network 102 by existing asset(s) 104, it is possible for regulatory and/or stakeholder agencies to actively monitor the admitted asset(s) 104 to determine further compliance with the access policies(s) of network 102. At process P11, a regulatory and/or stakeholder agency may manually (e.g., via a user) or automatically (e.g., via an automated service) determine whether admitted asset(s) 104 are complying with all policies. Where the regulatory and/or stakeholder agencies detect continued compliance (i.e., "Yes" at process P11), the method may return to process P8 of allowing continued operation of communication service 118 by the admitted asset(s) 104. Where the regulator and/or stakeholder agencies detect non-compliance (i.e., "No" at process P11), the method may proceed to process P5 of denying further access to the non-complying asset(s) 104 and notifying other regulatory or stakeholder agencies in process P6. The denied asset(s) 104 may then be re-adjudicated by other asset(s) 104 as a candidate asset 106 when seeking to re-enter network 102.

Illustrations with respect to one or more implementations, alterations and/or modifications can be made to the illustrated examples without departing from the spirit and scope of the appended claims. In addition, while a particular feature may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Notwithstanding that the numerical ranges and parameters setting forth the broad scope of embodiments are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less than 10" can assume negative values, e.g. −1, −2, −3, −10, −20, −30, etc.

As used herein, the term "configured," "configured to" and/or "configured for" can refer to specific-purpose features of the component so described. For example, a system or device configured to perform a function can include a computer system or computing device programmed or otherwise modified to perform that specific function. In other cases, program code stored on a computer-readable medium (e.g., storage medium), can be configured to cause at least one computing device to perform functions when that program code is executed on that computing device. In these cases, the arrangement of the program code triggers specific functions in the computing device upon execution. In other examples, a device configured to interact with and/or act upon other components can be specifically shaped and/or designed to effectively interact with and/or act upon those components. In some such circumstances, the device is configured to interact with another component because at least a portion of its shape complements at least a portion of the shape of that other component. In some circumstances, at least a portion of the device is sized to interact with at least a portion of that other component. The physical relationship (e.g., complementary, size-coincident, etc.) between the device and the other component can aid in performing a function, for example, displacement of one or more of the device or other component, engagement of one or more of the device or other component, etc.

In various embodiments, components described as being "coupled" to one another can be joined along one or more interfaces. In some embodiments, these interfaces can include junctions between distinct components, and in other cases, these interfaces can include a solidly and/or integrally formed interconnection. That is, in some cases, components that are "coupled" to one another can be simultaneously formed to define a single continuous member. However, in other embodiments, these coupled components can be formed as separate members and be subsequently joined through known processes (e.g., soldering, fastening, ultrasonic welding, bonding). In various embodiments, electronic components described as being "coupled" can be linked via conventional hard-wired and/or wireless means such that these electronic components can communicate data with one another.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A method for managing access policies, the method comprising:
   detecting, via at least one asset included in a wireless device network, at least one candidate asset attempting to enter the wireless device network from an external network, wherein a spectrum access protocol of the wireless device network is different from a spectrum access protocol of the external network, and wherein the at least one asset and the at least one candidate asset each include at least one device capable of communicatively exchanging data with other devices;
   constructing a spectrum profile for the wireless device network based on metadata for transactions between assets in the wireless device network, wherein at least one asset in the wireless device network includes a blockchain for recording the metadata for transactions between assets in the wireless data network;
   applying an access policy including the spectrum profile to the at least one candidate asset within the wireless device network; and
   admitting the at least one candidate asset to the wireless device network in response to applying the access policy to the at least one candidate asset.

2. The method of claim 1, wherein the blockchain includes:
   a primary blockchain for each transaction within the network indicative of a stakeholder requirement; and
   at least one sidechain associated with the primary blockchain, the at least one sidechain including a transaction indicative of lower-layer network interactions between assets within the wireless device network.

3. The method of claim 2, wherein the access policy further includes a spectrum allocation rule.

4. The method of claim 3, further comprising:
   verifying compliance with the spectrum allocation rule before admitting the at least one candidate asset to the wireless device network; and
   recording the verified compliance in the primary blockchain after admitting the at least one candidate asset to the wireless device network.

5. The method of claim 1, wherein the metadata includes one of a frequency, a bandwidth, a power consumption, a signal modulation, or a packet overhead.

6. The method of claim 1, wherein constructing the spectrum profile is further based on spatial data, temporal data, and spectral data included within a transaction between assets within the wireless device network.

7. The method of claim 1, wherein the access policy further includes a security policy or a monetization policy.

8. A computer program product stored on a non-transitory computer readable storage medium, the computer program product comprising program code, which, when being executed by at least one computing device, causes the at least one computing device to:
   detect, via at least one asset included in a wireless device network, at least one candidate asset attempting to enter the wireless device network from an external network, wherein a spectrum access protocol of the wireless device network is different from a spectrum access protocol of the external network, and wherein the at least one asset and the at least one candidate asset each include at least one device capable of communicatively exchanging data with other devices;
   construct a spectrum profile for the wireless device network based on metadata for transactions between assets in the wireless device network, wherein at least one asset in the wireless device network includes a blockchain for recording the metadata for transactions between assets in the wireless data network;
   apply an access policy including the spectrum profile to the at least one candidate asset within the wireless device network; and
   admitting the at least one candidate asset to the wireless device network in response to applying the access policy to the at least one candidate asset.

9. The computer program product of claim of claim 8, wherein the blockchain includes: a primary blockchain for each transaction within the network indicative of a stakeholder requirement; and
   at least one sidechain associated with the primary blockchain, the at least one sidechain including a transaction indicative of lower-layer network interactions between assets within the wireless device network.

10. The computer program product of claim 9, wherein the spectrum profile includes: a primary blockchain for each transaction within the network indicative of a stakeholder requirement; and
    at least one sidechain associated with the primary blockchain, the at least one sidechain including a transaction indicative of lower-layer network interactions between assets within the wireless device network.

11. The computer program product of claim 10, wherein the access policy further includes a spectrum allocation rule.

12. The computer program product of claim of claim 8, wherein the metadata includes one of a frequency, a bandwidth, a power consumption, a signal modulation, or a packet overhead.

13. The computer program product of claim of claim 8, wherein constructing the spectrum profile is further based on spatial data, temporal data, and spectral data included within a transaction between assets within the wireless device network.

14. The computer program product of claim of claim 8, wherein the access policy further includes a security policy or a monetization policy.

15. A computing device configured to perform a method by performing actions including:
    detecting, via at least one asset included in a wireless device network, at least one candidate asset attempting to enter the wireless device network from an external network, wherein a spectrum access protocol of the wireless device network is different from a spectrum access protocol of the external network, and wherein the at least one asset and the at least one candidate asset each include at least one device capable of communicatively exchanging data with other devices;
    constructing a spectrum profile for the wireless device network based on metadata for transactions between assets in the wireless device network, wherein at least one asset in the wireless device network includes a blockchain for recording the metadata for transactions between assets in the wireless data network;
    applying an access policy including the spectrum profile to the at least one candidate asset within the wireless device network; and
    admitting the at least one candidate asset to the wireless device network in response to applying the access policy to the at least one candidate asset.

16. The system of claim 15, wherein the blockchain includes:

a primary blockchain for each transaction within the network indicative of a stakeholder requirement; and at least one sidechain associated with the primary blockchain, the at least one sidechain including a transaction indicative of lower-layer network interactions between assets within the wireless device network.

17. The system of claim 15, wherein the access policy further includes a spectrum allocation rule.

18. The system of claim 15, wherein the metadata includes one of a frequency, a bandwidth, a power consumption, a signal modulation, or a packet overhead.

19. The system of claim 15, wherein constructing the spectrum profile is further based on spatial, temporal, and spectral data included within a transaction between assets within the wireless device network.

20. The system of claim 15, wherein the access policy further includes a security policy or a monetization policy.

* * * * *